United States Patent
Sun et al.

(10) Patent No.: US 11,686,857 B2
(45) Date of Patent: *Jun. 27, 2023

(54) GEOGRAPHICAL FEATURE/ARTIFICIAL STRUCTURES DETECTION AND APPLICATION FOR GNSS NAVIGATION WITH MAP INFORMATION

(71) Applicant: Samsung Electronics Co., Ltd., Gyeonggi-do (KR)

(72) Inventors: Debo Sun, Milpitas, CA (US); Qi Li, Cupertino, CA (US)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/826,349

(22) Filed: May 27, 2022

(65) Prior Publication Data

US 2022/0283319 A1  Sep. 8, 2022

Related U.S. Application Data

(63) Continuation of application No. 17/014,519, filed on Sep. 8, 2020, now Pat. No. 11,402,514.

(60) Provisional application No. 63/050,323, filed on Jul. 10, 2020.

(51) Int. Cl.
*G01S 19/40* (2010.01)
*G01S 19/48* (2010.01)
*G01S 19/50* (2010.01)
*G01S 19/39* (2010.01)

(52) U.S. Cl.
CPC ............ *G01S 19/40* (2013.01); *G01S 19/393* (2019.08); *G01S 19/48* (2013.01); *G01S 19/50* (2013.01)

(58) Field of Classification Search
CPC ........ G01S 19/40; G01S 19/393; G01S 19/50; G01S 19/25; G01C 21/005; G01C 21/30
See application file for complete search history.

(56) References Cited

U.S. PATENT DOCUMENTS

| | | |
|---|---|---|
| 7,193,559 B2 | 3/2007 | Ford et al. |
| 7,711,482 B2 | 5/2010 | Coatantiec et al. |
| 8,046,169 B2 | 10/2011 | Mazlum |
| 8,125,380 B2 | 2/2012 | Capozio |
| 8,625,696 B2 | 1/2014 | Vourc'h et al. |
| 9,435,651 B2 | 9/2016 | Morin |
| 9,587,951 B1 | 3/2017 | Hamida |
| 9,798,011 B2 | 10/2017 | MacGougan |
| 11,037,445 B2 | 6/2021 | Zeng |
| 2010/0026568 A1 | 2/2010 | Capozio et al. |
| 2014/0152494 A1 | 6/2014 | MacGougan et al. |

*Primary Examiner* — Cassi J Galt
(74) *Attorney, Agent, or Firm* — The Farrell Law Firm, P.C.

(57) ABSTRACT

A method of navigating with a global navigation satellite system (GNSS) includes receiving a GNSS signal, calculating a GNSS navigation solution according to the GNSS identifying map information corresponding to the GNSS navigation solution, detecting features from the identified map information, and correcting a GNSS navigation based on the features detected from the map information and the GNSS signal.

15 Claims, 5 Drawing Sheets

GEOGRAPHICAL FEATURE/ARTIFICIAL STRUCTURES DETECTION AND APPLICATION FOR GNSS NAVIGATION WITH MAP INFORMATION

PRIORITY

This application is a Continuation Application of U.S. patent application Ser. No. 17/014,519, which was filed in the U.S. Patent and Trademark Office (USPTO) on Sep. 8, 2020, and is based on and claims priority under 35 U.S.C. § 119(e) to U.S. Provisional Patent Application filed on Jul. 10, 2020 and assigned Ser. No. 63/050,323, the entire content of each of which is incorporated herein by reference.

FIELD

The present disclosure is generally related to global navigation satellite system (GNSS) navigation in artificial structures and geographical feature areas.

BACKGROUND

It is popular in GNSS navigation to use GNSS signals to detect geographical features or artificial structures. Map information also can be used to improve GNSS navigation, such as map matching. However, if only GNSS signals are used to detect the features or structures, the detection reliability and probability are low.

SUMMARY

According to one embodiment, a method of navigating with a GNSS includes receiving a GNSS signal, calculating a GNSS navigation solution according to the GNSS signal, identifying map information corresponding to the GNSS navigation solution, detecting features from the identified map information, and correcting a GNSS navigation based on the features detected from the map information and the GNSS signal.

According to one embodiment, a system for navigating with a GNSS includes a GNSS receiver, and a processor configured to receive a GNSS signal, calculate a GNSS navigation solution according to the GNSS signal, identify map information corresponding to the GNSS navigation solution, detect features from the identified map information, and correct a GNSS navigation based on the features detected from the map information and the GNSS signal.

According to one embodiment, an electronic device for navigating with a GNSS includes a GNSS receiver, and a processor configured to receive a GNSS signal, calculate a GNSS navigation solution according to the GNSS signal, identify map information corresponding to the GNSS navigation solution, detect features from the identified map information, and correct a GNSS navigation based on the features detected from the map information and the GNSS signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
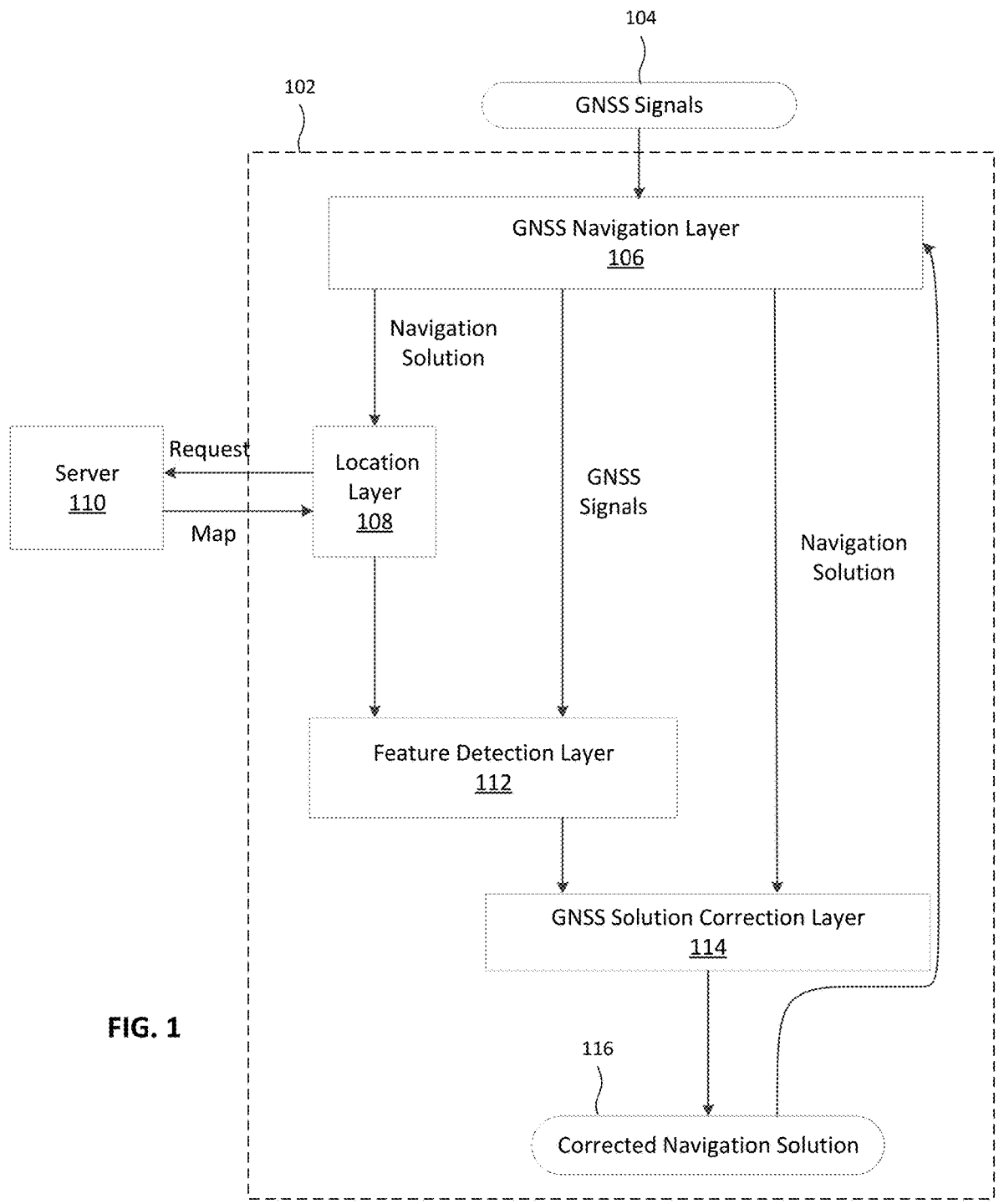
FIG. 1 illustrates a diagram of a GNSS system, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

With both map database and GNSS information, geographical features/artificial structures can be detected with high probability and low false alarm. Once they are detected, their location, heading, and other information obtained from the database can be used in GNSS navigation or used to improve a GNSS solution, thus improving the navigation performance.

Using GNSS signals to detect geographical features or artificial structures is popular in GNSS navigation. Those features or structures are used to identify GNSS environments, thus leading to better GNSS measurements and get better performance. If only GNSS signals are used to detect the features or structures, the detection reliability and probability are low since the GNSS signal change may be caused by other factors, thus decreasing the performance improvement. Generally, for different geographical features or artificial structures, GNSS signal has different patterns such as signal strength, the geometry of Space Vehicles (SVs) tracked, the distribution of SVs tracked in sky, etc. They can be used in the feature or structure detection. On the other hand, a map database includes the information of the features or structures, such as the location and heading. They can be used to help the feature or structure detection along with GNSS signals.

When the map database or information is available, it can be used to detect geographical features or artificial structures along with GNSS signals. For example, if the GNSS signal strength and the number of SVs tracked drop noticeably, and with the GNSS fix and map data, it shows that it is in a tunnel or near a tunnel, it is safe to say that it is entering a tunnel. Thus, the tunnel detection probability increases and the false alarm decreases. Once the position being in-tunnel is detected, if the GNSS signal strength and the number of SVs tracked increase noticeably, the position is exiting a tunnel, thus the tunnel exit location obtained from the map data can be used to correct the GNSS fix, and the tunnel exit direction also can be used to correct the GNSS heading (e.g., calculated from GNSS velocity). With the help of the tunnel exit location and heading obtained from the map, GNSS navigation performance will be significantly improved when exiting a tunnel. Generally, when exiting a tunnel, the GNSS solution performance is poor, and it is difficult to be improved because when approaching an exit, the GNSS signal environment is unfavorable.

Map information including the feature's location, direction, height, and/or depth can be used in feature detection. For example, an exit has location, direction, and depth information. Furthermore, a GNSS navigation position and heading can used in the feature search in a map database.

FIG. 1 illustrates a diagram of a GNSS system, according to an embodiment. The GNSS 102 receives GNSS signals 104 to perform navigation with the GNSS navigation layer 106. The GNSS 102 produces a navigation solution based on the GNSS signals 104. The GNSS 102 also includes a location layer 108. The location layer 108 may communicate with a server 110 to request map information that includes features, such as locations, headings, etc. The GNSS 102 may include a feature detection layer 112 that detects features and/or structures based on the map information and the GNSS signal 104. The GNSS 102 may include a GNSS solution correction layer 114 that processes the navigation solution from the navigation layer 106 with the features detected from the feature detection layer 112 to produce a corrected navigation solution 116.

Figure 2:
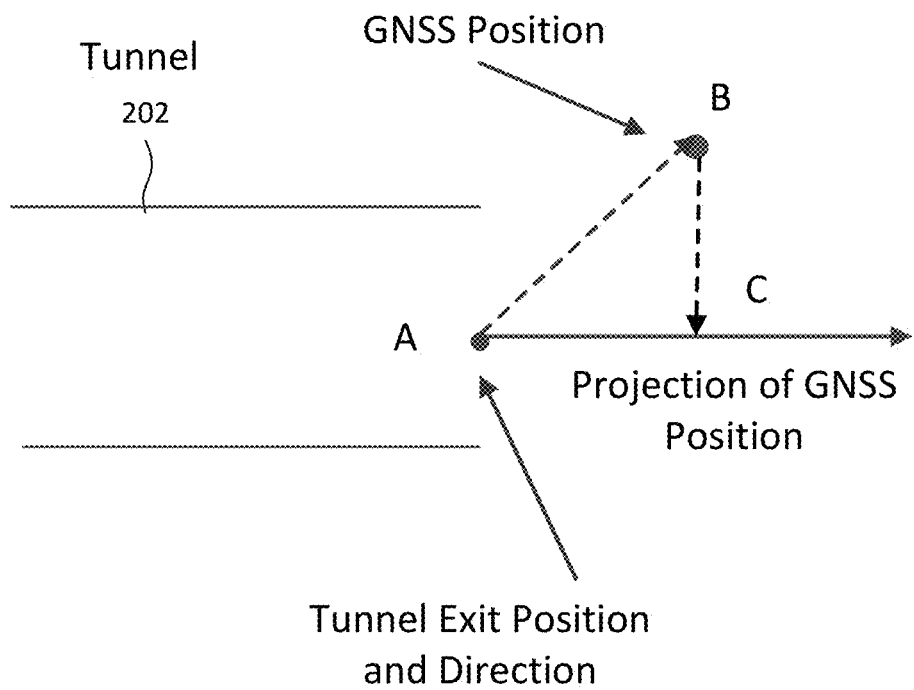
FIG. 2 illustrates a diagram of GNSS positioning based on tunnel exit position, according to an embodiment.

FIG. 2 illustrates a diagram of GNSS positioning based on tunnel exit position, according to an embodiment. With the tunnel 202, A represents the tunnel exit position, B represents the GNSS position, and C is the GNSS position projection on the tunnel exit direction. When exiting tunnels, GNSS positioning generally has a large error since the GNSS starts to re-track GNSS signals. To reduce those errors, tunnel exit information can be used such as the exit position and direction. A Kalman filter may be utilized.

Suppose the tunnel exit horizontal position is (LatA, LonA), and the GNSS horizontal position is (LatG, LonG). The point of the GNSS position projection on a tunnel exit direction (or on the road) is C, and its horizontal position is (LatC, LonC). Then, the vector AB can be expressed as (ABx, ABy), and BC can be expressed as (BCx, BCy). These vectors can be expressed as in Equation (1):

$$\overrightarrow{AB} + \overrightarrow{BC} + \overrightarrow{AC} \tag{1}$$

and as in Equation (2):

$$\frac{AB_x + BC_x}{AB_y + BC_y} = \tan(hdg_m) = \frac{\sin(hdg_m)}{\cos(hdg_m)} \tag{2}$$

where $hdg_m$ is the tunnel exit direction or heading. Then, as in Equation (3):

$$AB_x \cos(hdg_m) + BC_x \cos(hdg_m) = AB_y \sin(hdg_m) + BC_y \sin(hdg_m) \tag{3}$$

and, as in Equation (4).

$$AB_x \cos(hdg_m) - AB_y \sin(hdg_m) = BC_y \sin(hdg_m) - BC_x \cos(hdg_m) \quad (4)$$

If $dN=BC_y$, $dE=BC_x$ and $\Delta N=AB_y$, $\Delta E=AB_x$, then, as in Equation (5):

$$\Delta E \cos(hdg_m) - \Delta N \sin(hdg_m) = dN \sin(hdg_m) - dE \cos(hdg_m) \quad (5)$$

where $\Delta E$ is the difference between the GNSS position and the tunnel exit position in the East direction (in meters), and $\Delta N$ is the difference between the GNSS position and the tunnel exit position in the North direction (in meters), dN is the GNSS position error in the North direction from the road after exiting the tunnel, and dE is the GNSS position error in the East direction from the road after exiting the tunnel. $\Delta E \cos(hdg_m) - \Delta N \sin(hdg_m)$ is the GNSS position error measurement, dN and dE need to be estimated in the Kalman filter, and the measurement equation for a Kalman filter can be written as in Equation (6).

$$\Delta E \cos(hdg_m) - \Delta N \sin(hdg_m) = [\sin(hdg_m) \ -\cos(hdg_m)] \begin{bmatrix} dN \\ dE \end{bmatrix} \quad (6)$$

Denoting the measurement $\Delta E \cos(hdg_m) - \Delta N \sin(hdg_m)$ as z, then, as in Equation (7).

$$z = [\sin(hdg_m) \ -\cos(hdg_m)] \begin{bmatrix} dN \\ dE \end{bmatrix} \quad (7)$$

With the measurement noise, Equation (7) becomes Equation (8):

$$z = [\sin(hdg_m) \ -\cos(hdg_m)] \begin{bmatrix} dN \\ dE \end{bmatrix} + v \quad (8)$$

where v is the map matching or map aid measurement noise. Equation (8) is the measurement equation of the tunnel exit map aid with a Kalman filter. With the state equation of the GNSS receiver's Kalman filter, the tunnel exit map aid with a Kalman filter is designed.

Since the GNSS may have a large position error after exiting a tunnel, it can cause the angle between AB and the road/tunnel exit direction to be larger than 180 degrees. In this case, the GNSS position's projection is inside the tunnel. For this kind of projection or GNSS position, the tunnel exit position will be used directly in the map aid Kalman filter. The measurement equation is given as Equation (9):

$$\begin{bmatrix} \Delta N \\ \Delta E \end{bmatrix} = \begin{bmatrix} 1 & 0 \\ 0 & 1 \end{bmatrix} \begin{bmatrix} dN \\ dE \end{bmatrix} + \begin{bmatrix} v_N \\ v_E \end{bmatrix} \quad (9)$$

where $v_N$ and $v_E$ are the map position noise. Equation (9) is the measurement equation of the tunnel exit map position aid with a Kalman filter. With the state equation of the GNSS receiver's Kalman filter, the tunnel exit map position aid with a Kalman filter is designed.

In a situation where the GNSS fix is least squares (LSQ), the GNSS Kalman filter is not initialized. The GNSS position error will be corrected directly if it is large than 30 m considering the tunnel exit position error. Suppose the angle between AB and the road direction is cc, and the length of AB is then the in-track distance is $d_{intrack}=d \cos(\alpha)$ and the cross-track distance is $d_{crosstrack}=d \sin(\alpha)$. Thus, as in Equation (10):

$$LatC = LatA + d_{intrack} \cdot \frac{\cos(hdg_m)}{sf_N} \quad (10)$$

$$LonC = LonA + d_{intrack} \cdot \frac{\sin(hdg_m)}{sf_E}$$

where $sf_N$ and $sf_E$ are factors converting distances in the North direction and the East direction to latitude and longitude, respectively. The logic designed is, as in Equation (11).

$$\text{If } d_{intrack} < 0 \quad (11)$$

$$LatC = LatA$$

$$LonC = LonA$$

$$\text{Else if } d_{crosstrack} > 30$$

$$LatC = LatA + d_{intrack} \cdot \frac{\cos(hdg_m)}{sf_N}$$

$$LonC = LonA + d_{intrack} \cdot \frac{\sin(hdg_m)}{sf_E}$$

Figure 3:
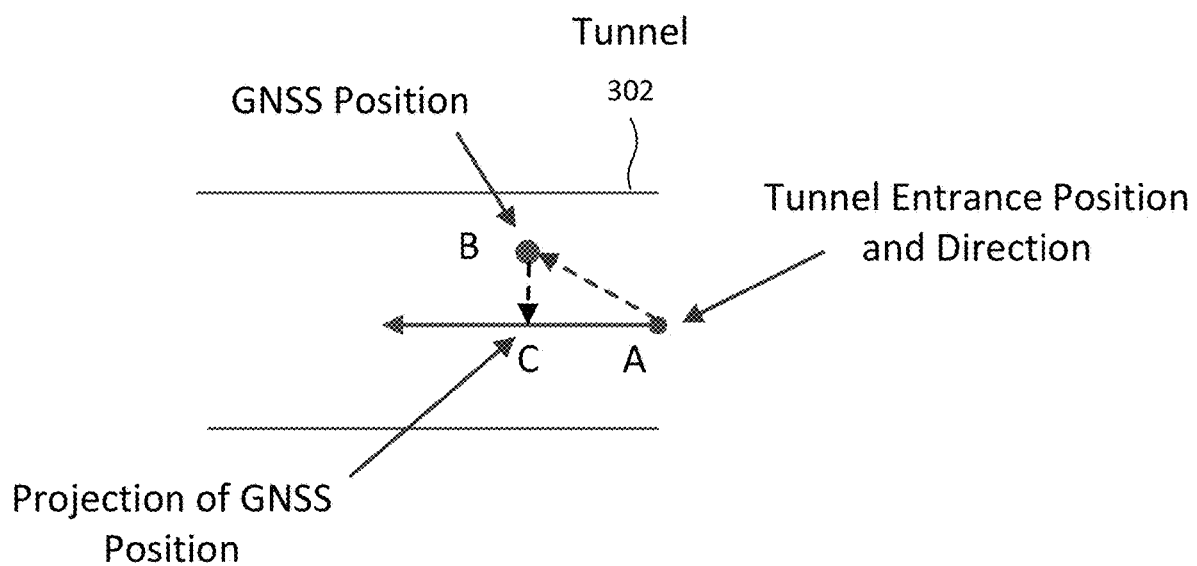
FIG. 3 illustrates a diagram of GNSS positioning based on tunnel entrance position, according to an embodiment.

FIG. 3 illustrates a diagram of GNSS positioning based on tunnel entrance position, according to an embodiment. With the tunnel 302, A represents the tunnel entrance position, B represents the GNSS position, and C represents the projection of the GNSS position. The tunnel entrance can be detected with the tunnel entrance map information and GNSS signals. Once the tunnel entrance is detected, navigation solution output will be stopped. And as soon as the tunnel entrance is detected, if the angle between AB and the road direction (i.e., AC) is less than 90 degrees, the system determines the position to be in the tunnel, and stops to output navigation solutions.

Figure 4:
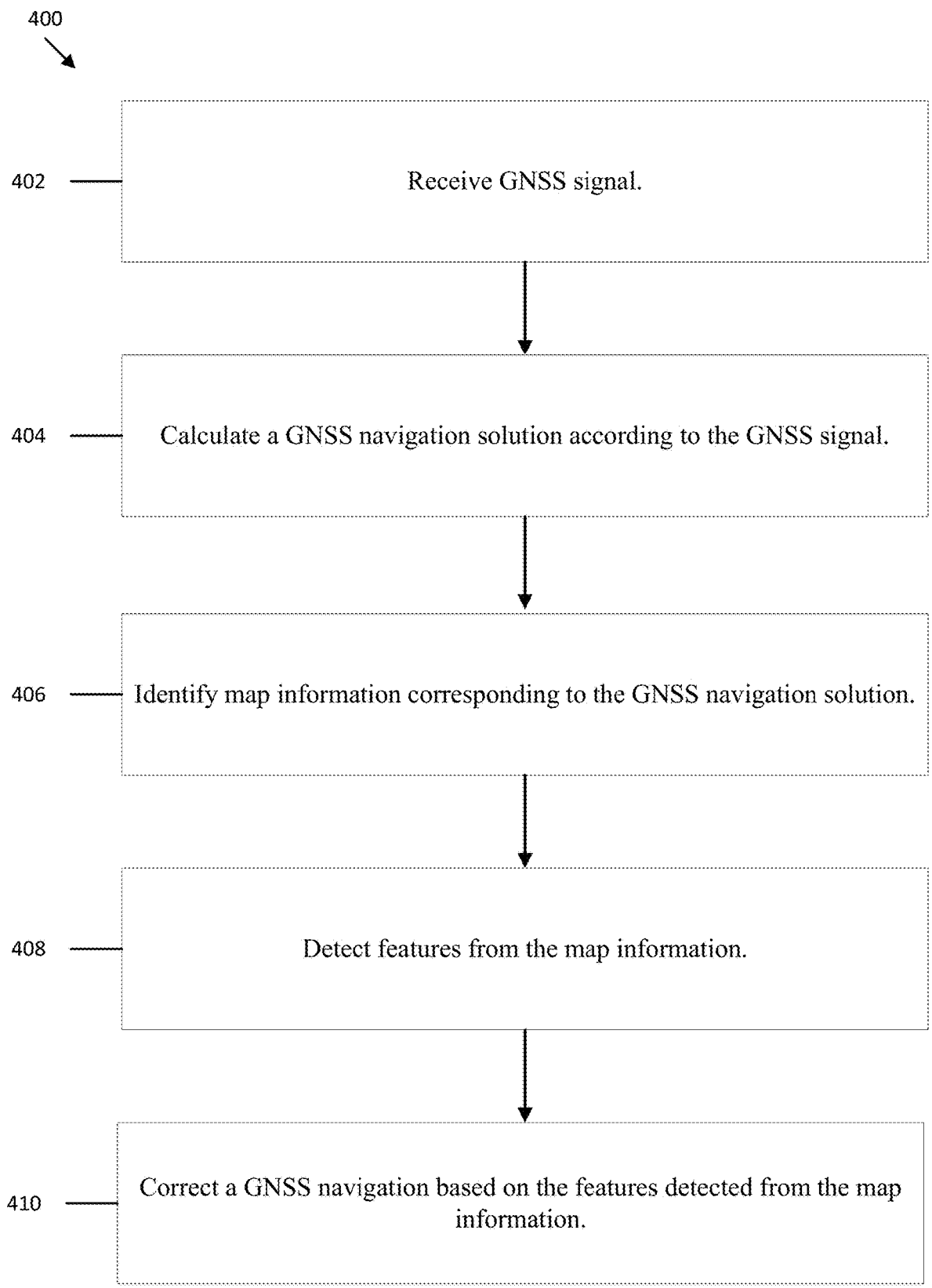
FIG. 4 illustrates a flowchart for a method of GNSS navigation, according to an embodiment.

FIG. 4 illustrates a flowchart 400 for a method of GNSS navigation, according to an embodiment. At 402, the system receives a GNSS signal. At 404, the system calculates a GNSS navigation solution according to the GNSS signal. At 406, the system identifies map information corresponding to the GNSS navigation solution. At 408, the system detects features, such as geographical or structural features, from the map information. The system may also detect features from the GNSS signal and/or the GNSS signal pattern. At 410, the system corrects the GNSS navigation solution based on the features detected from the map information. For example, the system may correct the GNSS navigation solution based on a tunnel entrance or exit position from the map information.

The system and method may include detection of areas where the GNSS signal may rapidly degrade or improve, and this information may be used as a confirmation that the true location is at an entrance/exit whose location is known a priori. Such detection may include tunnel detection with GNSS and map information, parking garage/structure detection with GNSS and map information, GNSS environment detection with GNSS and map information, indoor/outdoor detection with GNSS and map information, urban canyon detection with GNSS and map information, and the like.

Additional GNSS information can be used, such as GNSS signal strength, the geometry of SVs tracked, the distribution of SVs tracked in sky. This information will help to improve the detection probability and reliability of the features.

Figure 5:
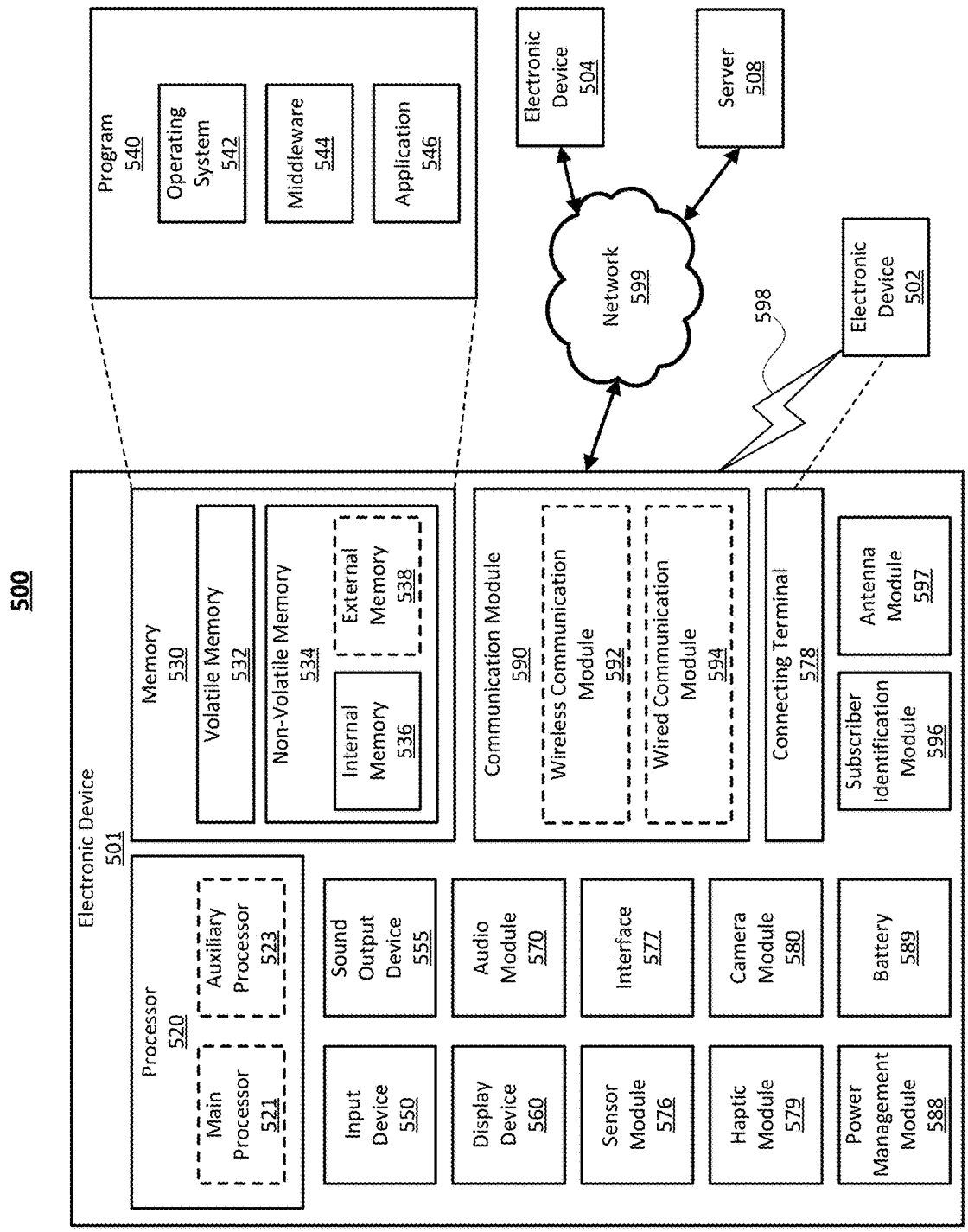
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534, The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (ER) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement)

or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of navigating with a global navigation satellite system (GNSS), comprising:
   receiving, with a GNSS receiver, GNSS signals from a plurality of GNSS satellites;
   calculating a GNSS navigation solution according to the received GNSS signals;
   identifying map information corresponding to the GNSS navigation solution;
   detecting features from the identified map information, wherein the detected features include at least one of a travel direction and an obstructed signal area entrance position, or an obstructed signal area exit position and an obstructed signal area exit direction;
   determining a first angle between a line along the obstructed signal area exit direction and a line between the obstructed signal area exit position and the GNSS navigation solution, or a second angle between a line along the travel direction and a line between the obstructed signal area entrance position and the GNSS navigation solution; and
   correcting the GNSS navigation solution based on the determined first or second angle.

2. The method of claim 1, wherein the obstructed signal area exit position and the obstructed signal area exit direction include a tunnel exit position and a tunnel exit direction, respectively.

3. The method of claim 1, wherein correcting the GNSS navigation solution is performed based on a GNSS position projection on the obstructed signal area exit direction relative to the obstructed signal area exit position.

4. The method of claim 1, wherein correcting the GNSS navigation solution is performed using a measurement equation for a Kalman filter.

5. The method of claim 1, wherein the obstructed signal area entrance position and the travel direction include a tunnel entrance position and a road direction, respectively.

6. A system for navigating, comprising:
   an electronic device including a global navigation satellite system (GNSS) receiver;
   a processor; and
   a non-transitory computer-readable storage medium storing a set of instructions which, when executed by the processor, causes the processor to:
   receive, from the GNSS receiver, GNSS signals from a plurality of GNSS satellites;
   calculate a GNSS navigation solution according to the received GNSS signals;
   identify map information corresponding to the GNSS navigation solution;
   detect features from the identified map information, wherein the detected features include at least one of a travel direction and an obstructed signal area entrance position, or an obstructed signal area exit position and an obstructed signal area exit direction;
   determine a first angle between a line along the obstructed signal area exit direction and a line between the obstructed signal area exit position and the GNSS navigation solution, or a second angle between a line along the travel direction and a line between the obstructed signal area entrance position and the GNSS navigation solution; and
   correct the GNSS navigation solution based on the determined first or second angle.

7. The system of claim 6, wherein the obstructed signal area exit position and the obstructed signal area exit direction include a tunnel exit position and a tunnel exit direction, respectively.

8. The system of claim 6, wherein the processor is further configured to correct the GNSS navigation solution based on a GNSS position projection on the obstructed signal area exit direction relative to the obstructed signal area exit position.

9. The system of claim 7, wherein the processor is further configured to correct the GNSS navigation solution using a measurement equation for a Kalman filter.

10. The system of claim 6, wherein the obstructed signal area entrance position and the travel direction include a tunnel entrance position and a road direction, respectively.

11. An electronic device for navigating with a global navigation satellite system (GNSS), comprising:
    a GNSS receiver; and
    a processor configured to:
    receive, from the GNSS receiver, GNSS signals from a plurality of GNSS satellites,
    calculate a GNSS navigation solution according to the received GNSS signals,
    identify map information corresponding to the GNSS navigation solution,
    detect features from the identified map information, wherein the detected features include at least one of a travel direction and an obstructed signal area entrance position, or an obstructed signal area exit position and an obstructed signal area exit direction,
    determine a first angle between a line along the obstructed signal area exit direction and a line between the obstructed signal area exit position and the GNSS navigation solution, or a second angle between a line along the travel direction and a line between the obstructed signal area entrance position and the GNSS navigation solution, and
    correct the GNSS navigation solution based on the determined first or second angle.

12. The electronic device of claim 11, wherein the obstructed signal area exit position and the obstructed signal area exit direction include a tunnel exit position and a tunnel exit direction, respectively.

13. The electronic device of claim 12, wherein the processor is further configured to correct the GNSS navigation solution based on a GNSS position projection on the obstructed signal area exit direction relative to the obstructed signal area exit position.

14. The electronic device of claim 12, wherein the processor is further configured to correct the GNSS navigation solution using a measurement equation for a Kalman filter.

15. The electronic device of claim 11, wherein the obstructed signal area entrance position and the travel direction include a tunnel entrance position and a road direction, respectively.

* * * * *